US012665227B2

(12) United States Patent
Ridisser et al.

(10) Patent No.: US 12,665,227 B2
(45) Date of Patent: Jun. 23, 2026

(54) BATTERY MODULE, A BATTERY PACK, AN ELECTRIC VEHICLE, A BMM CARRIER, A BMM ARRANGEMENT AND A METHOD FOR ASSEMBLING A BATTERY MODULE

(71) Applicant: SAMSUNG SDI CO., LTD., Yongin-si (KR)

(72) Inventors: Markus Ridisser, Premstätten (AT); Bernhard Hadler, Feldkirchen/Graz (AT); Matthias Pucher, Lebring (AT)

(73) Assignee: Samsung SDI Co., Ltd., Yongin-si (KR)

( * ) Notice: Subject to any disclaimer, the term of this patent is extended or adjusted under 35 U.S.C. 154(b) by 569 days.

(21) Appl. No.: 17/968,721

(22) Filed: Oct. 18, 2022

(65) Prior Publication Data

US 2023/0122982 A1 Apr. 20, 2023

(30) Foreign Application Priority Data

Oct. 19, 2021 (EP) ..................................... 21203346
Oct. 18, 2022 (KR) ........................ 10-2022-0133889

(51) Int. Cl.
| | |
|---|---|
| *H01M 10/42* | (2006.01) |
| *B60L 50/64* | (2019.01) |
| *H01M 50/213* | (2021.01) |
| *H01M 50/271* | (2021.01) |
| *H01M 50/284* | (2021.01) |
| *H01M 50/291* | (2021.01) |

(52) U.S. Cl.
CPC ........... *H01M 10/425* (2013.01); *B60L 50/64* (2019.02); *H01M 50/213* (2021.01); *H01M 50/271* (2021.01); *H01M 50/284* (2021.01);

*H01M 50/291* (2021.01); *H01M 2010/4271* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,172,121 | B2 | 10/2015 | Guner et al. |
| 10,741,889 | B2 | 8/2020 | Newman et al. |
| 11,594,772 | B2 | 2/2023 | Cournoyer et al. |
| 2011/0206948 | A1 | 8/2011 | Asai et al. |
| 2014/0212737 | A1 | 7/2014 | Bae et al. |

(Continued)

FOREIGN PATENT DOCUMENTS

| | | |
|---|---|---|
| CN | 102163702 A | 8/2011 |
| CN | 202352739 U | 7/2012 |

(Continued)

OTHER PUBLICATIONS

Extended European Search Report issued in corresponding application No. EP 21203346.8, dated Apr. 20, 2022, 8 pages.

(Continued)

*Primary Examiner* — Wyatt P McConnell
(74) *Attorney, Agent, or Firm* — Womble Bond Dickinson (US) LLP

(57) ABSTRACT

A battery module includes: a plurality of battery cells; a cell carrier including a plurality of cell retainers, each of the cell retainers being configured to hold one of the battery cells in a form locking manner; and a battery management module (BMM) arranged within a group of the cell retainers.

19 Claims, 5 Drawing Sheets

(56) References Cited

U.S. PATENT DOCUMENTS

| | | |
|---|---|---|
| 2016/0359210 A1 | 12/2016 | Hasegawa |
| 2018/0026243 A1 | 1/2018 | Stojanovic et al. |
| 2021/0050635 A1 | 2/2021 | Lee et al. |
| 2021/0098765 A1 | 4/2021 | Weinberger et al. |
| 2022/0255145 A1* | 8/2022 | Lee .................... H01M 50/514 |

FOREIGN PATENT DOCUMENTS

| | | |
|---|---|---|
| CN | 103700794 A | 4/2014 |
| CN | 106104846 A | 11/2016 |
| CN | 213546444 U | 6/2021 |
| DE | 10 2011 015 621 A1 | 10/2012 |
| DE | 10 2017 011 717 A1 | 5/2018 |
| EP | 3 273 500 A1 | 1/2018 |
| EP | 3 799 148 A1 | 3/2021 |
| JP | 2013-110080 A | 6/2013 |
| JP | 2015-191730 A | 11/2015 |
| KR | 10-2166635 B1 | 10/2020 |
| WO | WO 2019/164974 A1 | 8/2019 |

OTHER PUBLICATIONS

European Office Action dated Jan. 8, 2025, issued in European Patent Application No. 21203346.8 (4 pages).
Extended European Search Report issued in corresponding application No. EP 21203348.4, dated Apr. 22, 2022, 8 pages.
Chinese Office Action corresponding to Chinese Application No. 202211279175.1, dated Aug. 1, 2025 (8 pages).
Chinese Office Action dated Aug. 25, 2025, issued in Chinese Patent Application No. 202211278869.3 (8 pages).
US Office Action dated Jan. 20, 2026, issued in U.S. Appl. No. 17/968,692 (12 pages).

* cited by examiner

BATTERY MODULE, A BATTERY PACK, AN ELECTRIC VEHICLE, A BMM CARRIER, A BMM ARRANGEMENT AND A METHOD FOR ASSEMBLING A BATTERY MODULE

CROSS-REFERENCE TO RELATED APPLICATIONS

This application claims priority to and the benefit of European Patent Application No. 21203346.8, filed in the European Patent Office on Oct. 19, 2021, and Korean Patent Application No. 10-2022-0133889, filed in the Korean Intellectual Property Office on Oct. 18, 2022, the entire content of both of which are incorporated herein by reference.

BACKGROUND

1. Field

Aspects of embodiments of the present disclosure relate to a battery module, a battery pack including the battery module, an electric vehicle including the battery pack, a battery management module (BMM) carrier, a BMM arrangement, and a method for assembling a battery module.

2. Description of the Related Art

Recently, vehicles for transportation of goods and peoples have been developed that use electric power as a source for motion. Such an electric vehicle is an automobile that is propelled by an electric motor using energy stored in rechargeable batteries. An electric vehicle may be solely powered by batteries or may be a hybrid vehicle powered by, for example, a gasoline generator or a hydrogen fuel power cell. A hybrid vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries in that they are designed to provide power for sustained periods of time. A rechargeable (or secondary) battery differs from a primary battery in that it is designed to be repeatedly charged and discharged, while the latter is designed to provide an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for electric and hybrid vehicles and the like.

Rechargeable batteries may be used as a battery module formed of a plurality of unit battery cells coupled together in series and/or in parallel to provide a high energy content, such as for motor driving of a hybrid vehicle. The battery module may be formed by interconnecting the electrode terminals of the plurality of unit battery cells in a manner depending on a desired amount of power and to realize a high-power rechargeable battery.

Battery modules can be constructed either in a block design or in a modular design. In the block design, each battery is coupled to a common current collector structure and a common battery management system, and the unit thereof is arranged in a housing. In the modular design, pluralities of battery cells are connected together to form submodules, and several submodules are connected together to form the battery module. In automotive applications, battery systems generally include a plurality of battery modules connected together in series to provide a desired voltage. The battery modules may include submodules with a plurality of stacked battery cells, and each stack includes cells connected in parallel that are, in turn, connected in series (XpYs) or cells connected in series that are, in turn, connected in parallel (XsYp).

A battery pack is a set of any number of (usually identical) battery modules. The battery modules may be configured in series, parallel, or a mixture of both to deliver the desired voltage, capacity, and/or power density. Components of a battery pack include the individual battery modules and the interconnects, which provide electrical conductivity between the battery modules.

A battery system may further include a battery management system (BMS), which is an electronic system that manages the rechargeable battery, battery module, and battery pack, such as by protecting the batteries from operating outside their safe operating area (or safe operating parameters), monitoring their states, calculating secondary data, reporting that data, controlling its environment, authenticating it, and/or balancing it. For example, the BMS may monitor the state of the battery as represented by voltage (such as total voltage of the battery pack or battery modules, voltages of individual cells, etc.), temperature (such as average temperature of the battery pack or battery modules, coolant intake temperature, coolant output temperature, or temperatures of individual cells, etc.), coolant flow (such as flow rate, cooling liquid pressure, etc.), and current. Additionally, a BMS may calculate values based on the above items, such as minimum and maximum cell voltage, state of charge (SoC) or depth of discharge (DoD) to indicate the charge level of the battery, state of health (SoH; a variously-defined measurement of the remaining capacity of the battery as % of the original capacity), state of power (SoP; the amount of power available for a defined time interval given the current power usage, temperature, and other conditions), state of safety (SoS), maximum charge current as a charge current limit (CCL), maximum discharge current as a discharge current limit (DCL), and internal impedance of a cell (to determine open circuit voltage).

The BMS may be centralized such that a single controller is connected to the battery cells through a multitude of wires. The BMS may be also distributed, in which a BMS board is installed at each cell with just a single communication cable between the battery and a controller. Or the BMS may have a modular construction including a few controllers, each handling a certain number (e.g., a group or subset) of cells with communication between the controllers. Centralized BMSs are most economical but are least expandable and are plagued by a multitude of wires. Distributed BMSs are the most expensive but are simplest to install and offer the cleanest assembly. Modular BMSs offer a compromise of the features and problems of the other two topologies.

A BMS may protect the battery pack from operating outside its safe operating area. Operation outside the safe operating area may be indicated by over-current, over-voltage (e.g., during charging), over-temperature, under-temperature, over-pressure, and ground fault or leakage current detection. The BMS may prevent (or mitigate) operation outside the battery's safe operating area by including an internal switch, such as a relay or solid-state device, which opens if the battery is operated outside its safe operating area, by requesting the devices to which the battery is connected to reduce or even terminate using the battery, and by actively controlling the environment, such as through heaters, fans, air conditioning, or liquid cooling.

The mechanical integration of such a battery system requires appropriate mechanical connections between the individual components, for example, between battery cells, the BMS, and the housing. These connections must remain functional and safe throughout the average service life of the battery system. Further, installation space and interchangeability requirements must be met, especially in mobile applications.

Conventional battery systems, despite any modular structure, generally include a battery housing that acts as enclosure to seal the battery system against the environment and provides structural protection of the battery system's components. Housed battery systems are generally mounted as a whole into their application environment, for example, into an electric vehicle. Thus, the replacement of defective system parts, such as a defective battery submodule, requires dismounting (or removing) the whole (or entire) battery system from its application environment and removal of its housing. Even defects of small and/or cheap system parts may lead to dismounting and replacement of the entire battery system and its separate repair. Because high-capacity battery systems are expensive, large, and heavy, such a service procedure is burdensome and the storage, such as in the mechanic's workshop, of the bulky battery systems is difficult.

Static control of battery power output and charging may not be sufficient to meet the dynamic power demands of various electrical consumers connected to the battery system. Thus, steady exchange of information between the battery system and the controllers of the electrical consumers may be employed. This information may include the battery system's actual state of charge (SoC), potential electrical performance, charging ability, and internal resistance as well as actual or predicted power demands or surpluses of the consumers.

Therefore, battery systems may include a battery management system (BMS) for obtaining and processing such information on a system level and may include a plurality of battery module managers, also called battery management modules (BMMs), which are part of the system's battery modules and obtain and process relevant information on a module level. The BMS usually measures the system voltage, the system current, the local temperature at different places inside the system housing, and the insulation resistance between live components and the system housing. The BMMs usually measure the individual cell voltages and temperatures of the battery cells in a battery module.

Thus, the BMS/BMM is provided to manage the battery pack, such as by protecting the battery from operating outside its safe operating area (or safe operating parameters), monitoring its state, calculating secondary data, reporting that data, controlling its environment, authenticating it, and/or balancing it.

In conventional battery packs including cylindrical cells having an axis in a Z direction, battery management systems are generally placed within a battery module on a top or, when packaging space in the Z direction is not available, =on a side of the battery module.

SUMMARY

The present disclosure is defined by the appended claims and their equivalents. Any disclosure lying outside the scope of the claims and their equivalents is intended for illustrative as well as comparative purposes.

According to one embodiment of the present disclosure, a battery module includes: a plurality of battery cells; a (e.g., at least one) cell carrier; and a battery management module (BMM). The cell carrier includes a plurality of cell retainers, and each of the cell retainers is configured to hold one of the battery cells in a form locking manner. The BMM is arranged within a plurality of the cell retainers.

According to another embodiment of the present disclosure, a battery pack includes a plurality of battery modules as described above.

Another embodiment of the present disclosure provides an electric vehicle including a battery module as described above and/or a battery pack as described above.

Another embodiment of the present disclosure provides a BMM carrier configured to retain a BMM within a plurality of adjacent cell retainers of a cell carrier for a battery module.

Another embodiment of the present disclosure provides a BMM arrangement including: a plurality of BMMs; a collector circuit board configured to electrically connect the BMMs with one or more battery cells; and an adapter mounted to the collector circuit board. The adapter is configured to be arranged within a cell retainer of a cell carrier in a form locking manner.

Another embodiment of the present disclosure provides a method for assembling a battery module as described above. The method includes: a) providing a plurality of battery cells, a cell carrier, and a battery management module (BMM), the cell carrier including a plurality of cell retainers, and each of the cell retainers being configured to hold one of the battery cells in a form locking manner; and b) arranging the BMM within a plurality of the cell retainers.

Further aspects and features of the present disclosure can be learned from the dependent claims and/or the following description.

BRIEF DESCRIPTION OF THE DRAWINGS

Aspects and features of the present disclosure will become apparent to those of ordinary skill in the art by describing, in detail, embodiments thereof with reference to the attached drawings, in which.

DETAILED DESCRIPTION

Figure 1:
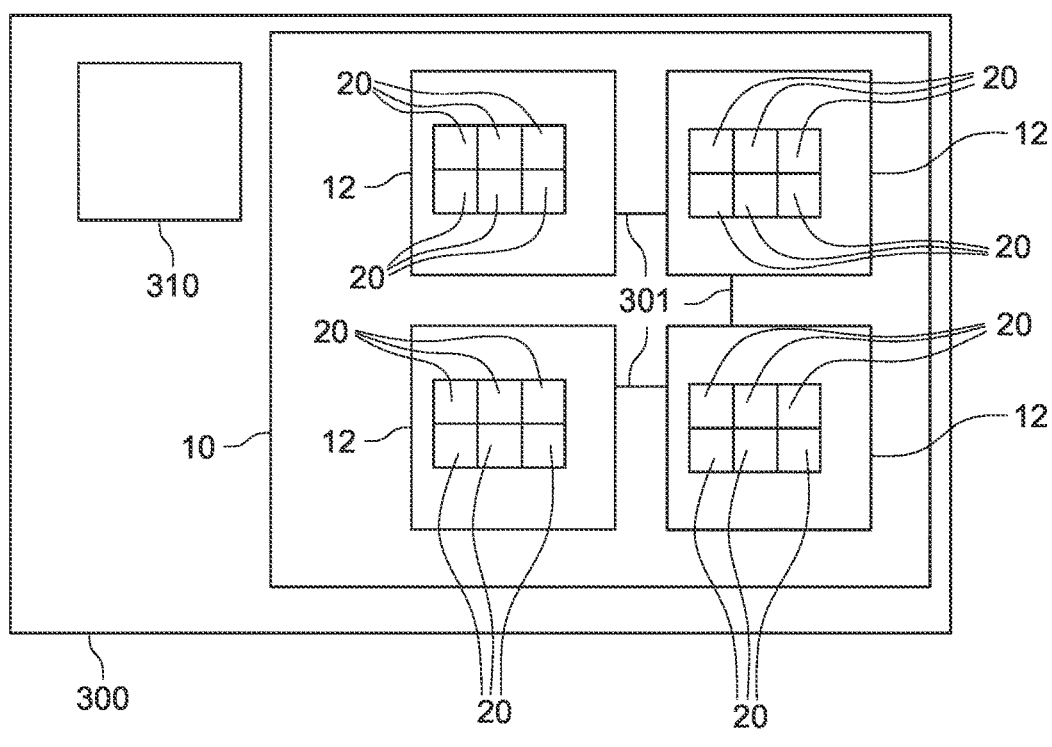
FIG. 1 is a schematic view of an electric vehicle according to an embodiment of the present disclosure.

Reference will now be made, in detail, to embodiments, examples of which are illustrated in the accompanying drawings. Aspects and features of the present disclosure, and implementation methods thereof, will be described with reference to the embodiments as shown in the accompanying drawings.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

According to one embodiment of the present disclosure, a battery module includes: a plurality of battery cells, a (e.g., at least one) cell carrier, and a battery management module (BMM). The cell carrier includes (or defines) a plurality of cell retainers. Each of the cell retainers is configured (e.g., shaped) to hold one of the battery cells in a form locking manner, for example, by providing a cavity in which a battery cell can be retained (or held). Thus, the cell carrier is configured to retain the plurality of battery cells.

The BMM is arranged within a plurality of (e.g., at least two) of the cell retainers. For example, the BMM is held by the same cell carrier as the battery cells but is held by two of the cell retainers that could be used to hold the battery cells. Because the retainers for holding the battery cells are used to accommodate the BMM, a separate holder or retainer to fix the BMM inside the battery module can be omitted. Thus, the BMM is accommodated in a space-saving manner between the battery cells and within the battery module. The package-optimized BMM is placed in an existing cell carrier and, therefore, saves space and additional monetary savings are achievable as the manufacture of such a battery module can be efficiently performed. Arranging the BMM within at least two of the cell retainers means that the BMM is arranged near to the battery cells, which can facilitate the electrical connection between the BMM and the battery cells.

In some embodiments, the BMM is arranged within at least two of the cell retainers in a form locking manner to efficiently and reliably mount the BMM within the cell retainer.

In some embodiments, the battery module includes a BMM carrier configured to retain the BMM within the at least two cell retainers. The BMM carrier is configured to be arranged within at least two of the cell retainers and to hold the BMM therein. Therefore, the BMM can have any shape that is suitable for being held by the BMM carrier. For example, the BMM may include a printed circuit board and an electrical connector that are retained in the BMM carrier. While the printed circuit board and the electrical connector would otherwise be difficult to mount to the at least one cell retainer, the BMM carrier has a shape that matches the at least two cell retainers to be arranged therein in a form locking manner. Thus, the BMM carrier matches the shape of the at least two cell retainers to facilitate an arrangement of the BMM in a form locking manner within the cell retainer.

In some embodiments, the BMM carrier is arranged in two or more adjacent cell retainers. In such an embodiment, the BMM extends in one direction to a greater extent than an extension of battery cells, for example, a diameter of one of the battery cells. For example, the BMM may include a printed circuit board having an extension (e.g., a dimension or a greatest dimension) that is larger than the diameter of each of the cylindrical battery cells. Adjacent cell retainers are connected to each other so that the BMM carrier can be arranged within the adjacent cell retainers. Therein, the BMM carrier may accommodate the printed circuit board, which is thereby arranged within the adjacent cell retainers. For example, the BMM carrier is arranged in two adjacent cell retainers in a form locking manner as described above.

In some embodiments, each of the battery cells is cylindrically shaped, and each of the cell retainers is at least partly cylindrically shaped and/or has a cylindrical through-hole (e.g., an opening). The cylindrical shape allows for an effective and simple arrangement of cylindrically shaped battery cells within the cell retainers, which include a cylindrical cavity for accommodating a battery cell. A cylindrical through-hole enables an efficient mounting of the battery cells by insertion of the battery cells into the cell retainer at one end thereof opposite to the through-hole, while the battery cells are accessible at both ends thereof to provide electrical connection. Alternatively or additionally, the cell retainers may have the shape of a cylindrical segment and/or adjacent cell retainers may be connected with each other. For example, adjacent cell retainers within one row may be connected with each other. In some embodiments, each of the retainers includes a ring-shaped projection to prevent the battery cells and/or the BMM held therein from moving (or from falling out of the cell retainer(s)).

In some embodiments, the battery module includes a removable bottom cover, and the BMM is removably arranged within the at least two cell retainers to enable simple and efficient service and/or changing of the BMM. After the bottom cover is removed, the BMM can be removed by, for example, pulling the BMM out of the at least two retainers in which the BMM is arranged.

In some embodiments, the battery module includes an adapter and a collector circuit board configured to electrically connect the BMM with one or more of the battery cells. The adapter may be mounted to the collector circuit board and arranged within one of the cell retainers in a form locking manner. The adapter is mounted to the collector circuit board to fix the position of the collector circuit board relative to the adapter. The adapter is arranged within one of the cell retainers to be retained therein. Thus, the collector circuit board is held in a fixed position relative to the cell carrier within the battery module. This embodiment enables holding the collector circuit board in a space-saving manner because the adapter is retained within one of the cell retainers. The collector circuit board can be formed by a printed circuit board (e.g., in a flat arrangement of electronics components), which consumes a minimal amount of mounting space in a z-direction (e.g., a height direction). In some embodiments, the adapter is cylindrically shaped to be retained in one of the cell retainers in a form locking manner.

In some embodiments, the battery module includes a plurality of BMMs, and the collector circuit board is configured to electrically connect each of the battery cells to one of the BMMs. In such an embodiment, the BMMs can be efficiently and space-savingly held by the cell carrier, which is particularly useful when cylindrical cells are used in the battery module because, depending on the number of battery cells, two or more BMMs may be necessary to electrically interconnect each of the battery cells with one of the BMMs. To electrically connect each of the battery cells with one of BMMs, the collector circuit board may include an electrical connector to which an interconnection arrangement can be connected, and the interconnection arrangement may electrically interconnect the collector circuit board with each of the battery cells, by, for example, current collector structures, such as busbars.

In some embodiments, the plurality of cell retainers is arranged in a hexagonal pattern and/or the plurality of cell retainers is arranged in a meandering row so that a plurality of adjacently arranged rows form a hexagonal arrangement of cell retainers. The hexagonal pattern may be called a honeycomb pattern. The hexagonal pattern means that cell retainers are surrounded (e.g., surrounded in a plan view) in a regular pattern by six neighboring cell retainers of the cell carriers and/or of the battery module. The arrangement of the battery cell retainers in a hexagonal pattern allows for a particularly space-saving construction of the battery module.

In some embodiments, the battery module includes a plurality of the cell carriers, and each of the cell carriers is stackable. The battery module may be built from stacked cell carriers. For example, the cell carriers may be shaped and/or configured to be arranged next to each other while efficiently using the available space. For example, an effective arrangement of cell retainers means that neighboring cell carriers can be arranged next to each in other in a stacked manner without leaving a gap between battery cells that are retained within the cell retainers. In some embodiments, the cell carriers include mechanical connection members that are configured to guide neighboring cell carriers during manufacturing so that the neighboring cell carriers are effectively arranged next to each other and configured to mechanically hold the neighboring cell carriers next to each other in the mounted state. This enables the adjacently arranged cell carriers to be arranged adjacent to each other in a stacked manner to provide a modularly constructed battery module and facilitates efficient mountability of the battery module. Therein, the BMM is arranged within at least two of the cell retainers of one of the plurality of cell carriers and/or within cell retainers of two adjacently arranged cell carriers. For example, a BMM may be retained by the cell retainers of a single cell carrier while an adjacent cell carrier retains only battery cells, or a BMM may be retained by cell retainers of adjacently arranged cell carriers. This efficiently enables highly variable possibilities of mounting the battery module by allowing different possibilities of arranging cell carriers, battery cells, and the BMM for mounting the battery module.

According to another embodiment of the present disclosure, a battery pack is includes a plurality of battery modules as described above. For example, the battery pack includes a plurality of battery modules, each of which includes a cell carrier with a plurality of cell retainers. The BMM is retained within at least two of the cell retainers. This provides space-saving construction of the battery pack. The battery pack and/or the battery modules of the battery pack may include any of the above-mentioned features.

Yet another embodiment of the present disclosure provides an electric vehicle including at least one battery module as described above and/or at least one battery pack as described above. For example, the electric vehicle includes a plurality of battery modules, each of which includes at least one cell carrier with a plurality of cell retainers. The BMM is retained within at least two of the cell retainers. This provides a space-saving design. The electrical vehicle and/or the battery modules mounted therein may include any of the above-mentioned features.

Yet another embodiment of the present disclosure provides a BMM carrier configured to retain a BMM within at least two adjacent cell retainers of at least one cell carrier for a battery module. In some embodiments, the BMM carrier includes a housing made of plastic. In some embodiments, the housing includes two cylindrical carrier sections that are configured to be retained in one cell retainer, respectively. The BMM carrier enables the retainers for holding the battery cells to be used to accommodate the BMM, as described above. Thus, a separate holder or retainer to fix the BMM inside the battery module may be omitted. Thus, the BMM can be accommodated in a space-saving manner between the battery cells and within the battery module. The BMM carrier may include any of the features as described above with reference to the BMM carrier.

Yet another embodiment of the present disclosure provides a BMM arrangement including: at least two BMMs; a collector circuit board configured to electrically connect the at least two BMMs with one or more battery cells; and an adapter mounted to the collector circuit board. The adapter is configured to be arranged within a cell retainer of a cell carrier in a form locking manner. The BMM arrangement is configured to be mounted in a battery module. The adapter retains the adapter within a battery cell retainer, and therefore, the BMM arrangement is held fixed in the battery module. In some embodiments, the BMM arrangement includes one BMM carrier for each of the at least two BMMs, and each of the BMM carriers is configured to retain a BMM within at least two adjacent cell retainers of the cell carrier. The BMM arrangement and its components may include the features as described above Yet another embodiment of the present disclosure provides a method for assembling a battery module as described above. The method includes: a) providing a plurality of battery cells, at least one cell carrier, and at least one battery management module (BMM), the at least one cell carrier including a plurality of cell retainers, and each of the cell retainers being configured to hold one of the battery cells in a form locking manner; and b) arranging the at least one BMM within at least two of the cell retainers. This method provides a battery module as described before. The method can be modified so that the assembled battery module includes any of the above-mentioned features.

FIG. 1 illustrates a schematic view of an electric vehicle 300 according to an embodiment of the present disclosure. The electric vehicle 300 is propelled by an electric motor 310 using energy stored in rechargeable batteries arranged in a battery pack 10. The battery pack 10 is a set of any number of battery modules 12. The battery modules 12 each include a plurality of secondary battery cells 20. Components of the battery pack 10 include the individual battery modules 12 and interconnects 301, which provide electrical conductivity between battery modules 12. Each of the battery modules 12 includes the battery cells 20.

Figure 2:
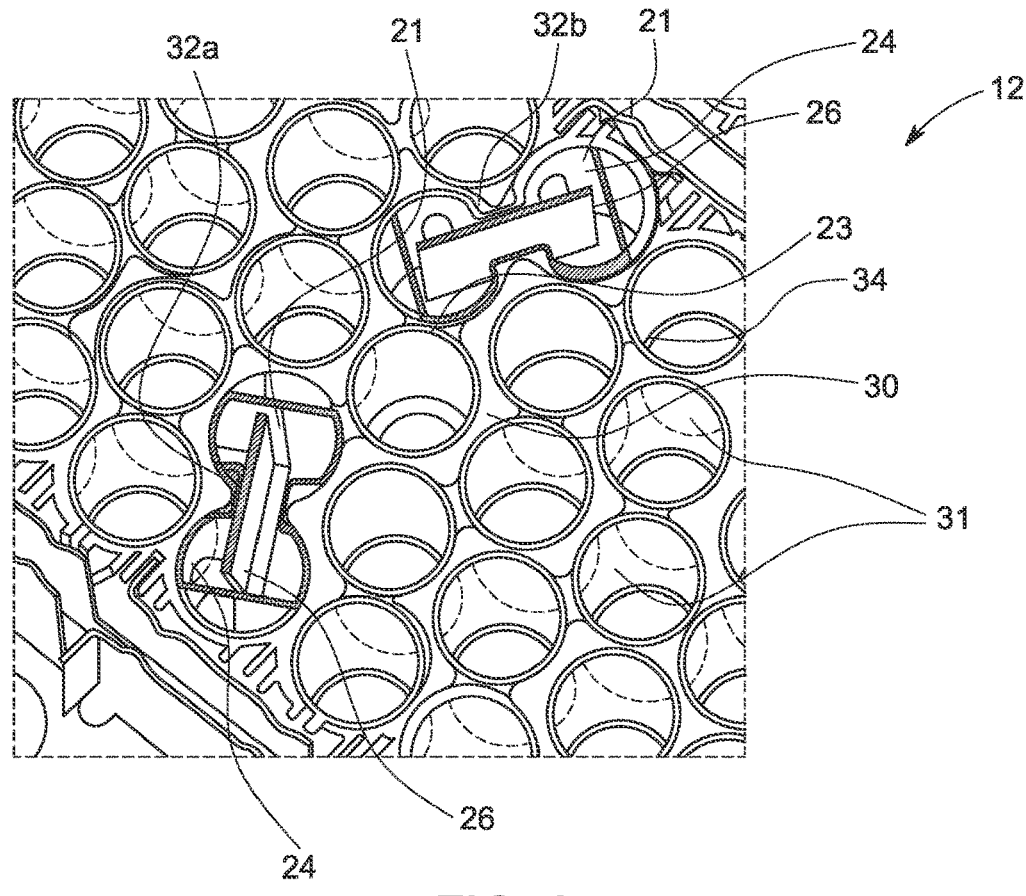
FIG. 2 is a sectional view of a battery module according to an embodiment of the present disclosure.

FIG. 2 illustrates a sectional view of a battery module 12 according to an embodiment of the present disclosure.

The battery module 12 includes a cell carrier 30 including (or forming) a plurality of cell retainers 31. The plurality of cell retainers 31 is arranged in a hexagonal pattern (see, e.g., FIGS. 10A and 10B). A plurality of the cell retainers 31 is arranged in meandering row so that a plurality of adjacently arranged rows form a hexagonal arrangement of cell retainers 31. In some embodiments, the cell carrier 30 is made of a polymer to provide a lightweight cell carrier 30 that is efficient to manufacture.

Each of the cell retainers 31 is configured to hold (or accommodate) one of the battery cells 20 in a form locking manner. Each of the battery cells 20 is cylindrically shaped, and each of the cell retainers 31 is cylindrically shaped. The shape of the battery cells 20 and the cell retainers 31 match (or correspond) such that the battery cells 20 can be held by the cell retainers 31 in a form locking manner. Each of the cell retainers 31 has a cylindrical through-hole (e.g., an opening) through (or into) which one of the battery cells 20 can be inserted to be retained in the cell retainer 31. Each of the retainers 31 includes a projection 34 to prevent the battery cells 20 held therein from moving (e.g., from falling out of the bottom thereof). The projection 34 is ring-shaped to effectively reduce the diameter of the through-hole and/or the cell retainer 31.

The battery module 12 includes two battery management modules 21, abbreviated as BMMs 21. Each of the BMMs 21 is arranged in two of the cell retainers 31. In the illustrated embodiment, the BMMs 21 are arranged within the same meandering row of the cell carrier 30 and in two pairs 32a, 32b of adjacent cell retainers 31 of the same meandering row. The cell retainer 31 between the two pairs 32a, 32b of adjacent cell retainers 31 retains an adapter 23, which is further described with reference to FIG. 6. The two pairs 32a, 32b of adjacent cell retainers 31 are pairs of connected cell retainers 31. For example, the cell carrier 30 is shaped so that each of the cell retainers 31 of the two pairs 32a, 32b is a cylinder segment, and a circumferential section of the cell retainer 31 of one of the two pairs 32a, 32b is open to connect to the other cell retainer 31 of said pair 32a, 32b.

The battery module 12 includes two BMM carriers 24 configured to retain the BMMs 21 within the cell retainers 31. For example, the battery module 12 includes one BMM carrier 24 for each of the BMMs 21. By using the BMM carriers 24, the BMMs 21 are arranged within the cell retainers 31 in a form locking manner. Each of the BMM carriers 24 is configured to hold a printed circuit board 26 of one of the BMMs 21. The BMM carrier 24 is, in one embodiment, made of a polymer. The printed circuit board 26 of each of the BMMs 21 is arranged in one of the two pairs 32a, 32b of cell retainers 31. In some embodiments, the BMM carrier 24 is held with a plastic clip system into the cell carrier 30. The BMM carriers 24 are further described with respect to FIG. 5.

Figure 8:
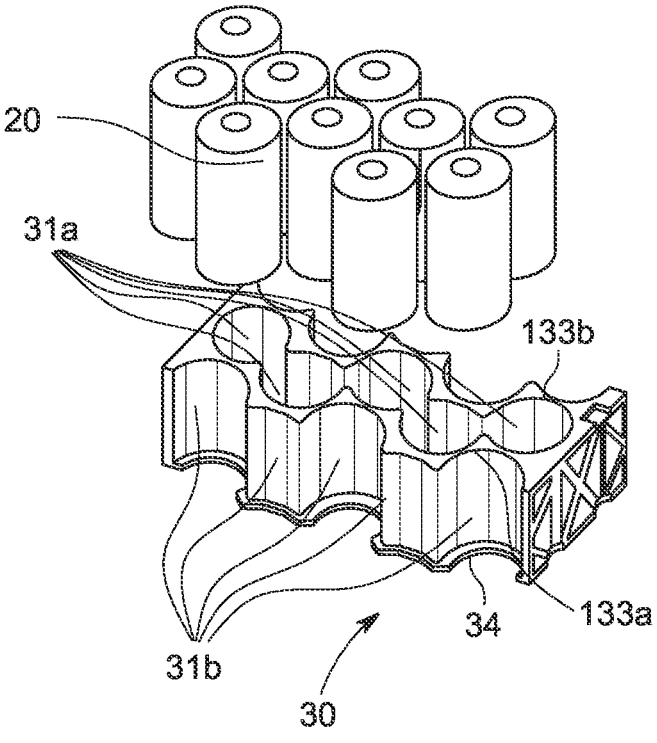
FIG. 8 is a perspective view of a cell carrier and a plurality of battery cells.
Figure 9:
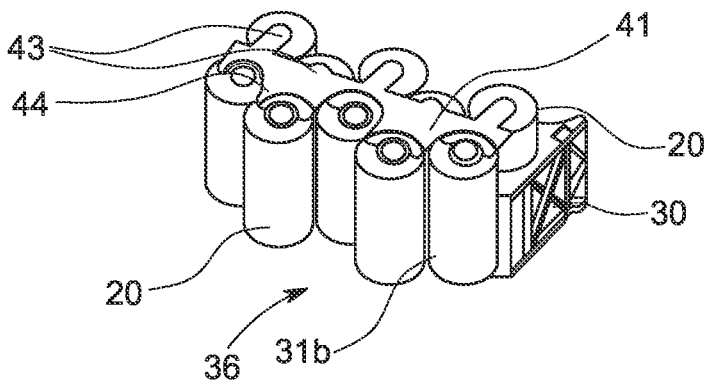
FIG. 9 is a perspective view of a cell assembly.

The BMMs 21, together with the BMM carriers 24, have the same shape as the battery cells 20 and can be placed between a cell stack formed by the battery cells 20 (see, e.g., FIGS. 8 and 9). Accordingly, no separate part has to be produced to retain the BMMs 21 in the battery module 12

Figure 3:
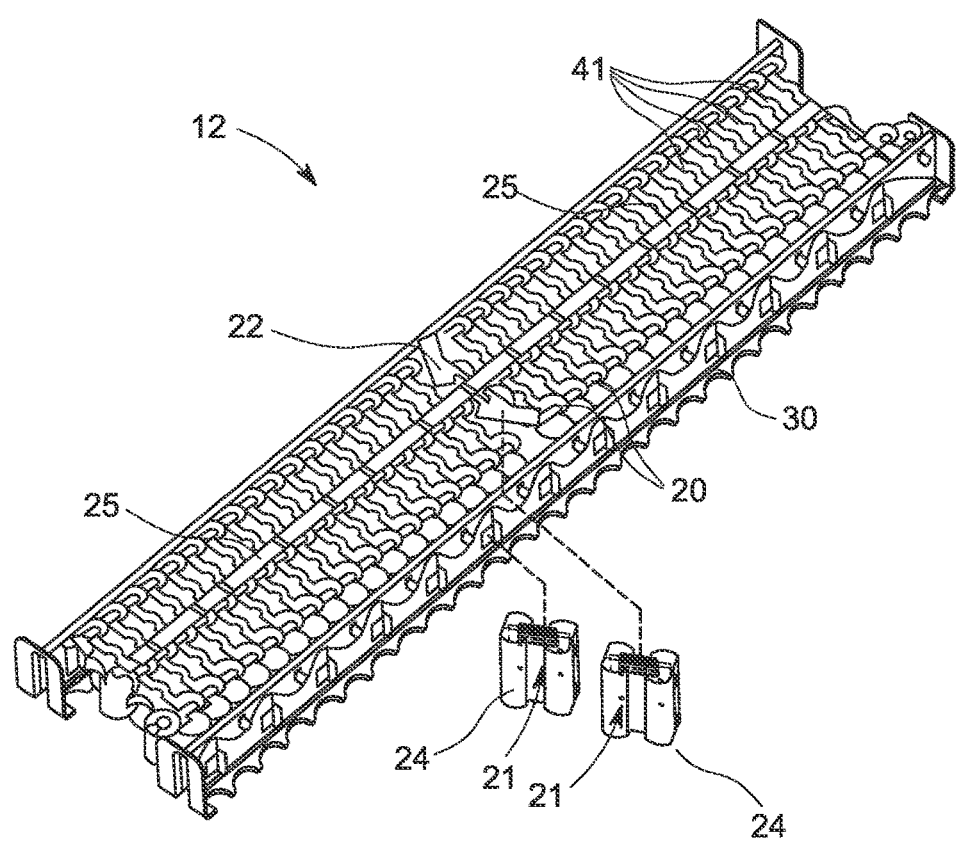
FIG. 3 is a perspective view of battery module according to an embodiment of the present disclosure.

FIG. 3 is a perspective view of a battery module 12 according to an embodiment of the present disclosure.

The battery module 12 includes the cell carrier 30 as shown in FIG. 2 and as explained with reference thereto. The two BMMs 21 are shown below the cell carrier 30. The BMMs 21 may be mounted to the cell carrier 30 by inserting the BMMs 21 and the BMM carriers 24 into the cell retainers 31 as indicated by the dashed line.

The battery module 12 includes a collector circuit board 22, which is configured to electrically connect each of the battery cells 20 with one of the BMMs 21. The battery module 12 includes an interconnection arrangement 25 and a plurality of busbars 41. The interconnection arrangement 25 includes a flat flex cable (FFC), and the collector circuit board 22 includes a flexible printed circuit (FPC). The interconnection arrangement 25 is electrically connected with the collector circuit board 22, which is electrically connected to the BMMs 21, as explained in more detail with reference to FIG. 6. The interconnection arrangement 25 extends throughout the battery module 12 to electrically interconnect the collector circuit board 22 with each of the busbars 41. The busbars 41 are configured and arranged to electrically interconnect a plurality of battery cells 20 with each other and with the collector circuit board 22 via the interconnection arrangement 25. For example, each of the busbars 41 electrically interconnects a meandering row of battery cells 20 with each other. Thus, each of the plurality of battery cells 20 is electrically interconnected with one of the BMMs 21. The BMMs 21 are mounted by inserting the BMMs 21 and the BMM carriers into the pairs 32a, 32b of adjacent cell retainers 31 that are arranged below the collector circuit board 22.

In some embodiments, the battery cells 20 are cylindrical cells with a diameter of at least 30 mm, and in some embodiments, at least 32 mm. In some embodiments, the diameter of the cell retainer 31 is at least 30 mm or at least 32 mm. This allows for the battery cells 20 having a similar diameter to be held in the cell retainers 31 and provides sufficient space for the BMMs 21 to be arranged within the battery retainers 31.

Figure 4:
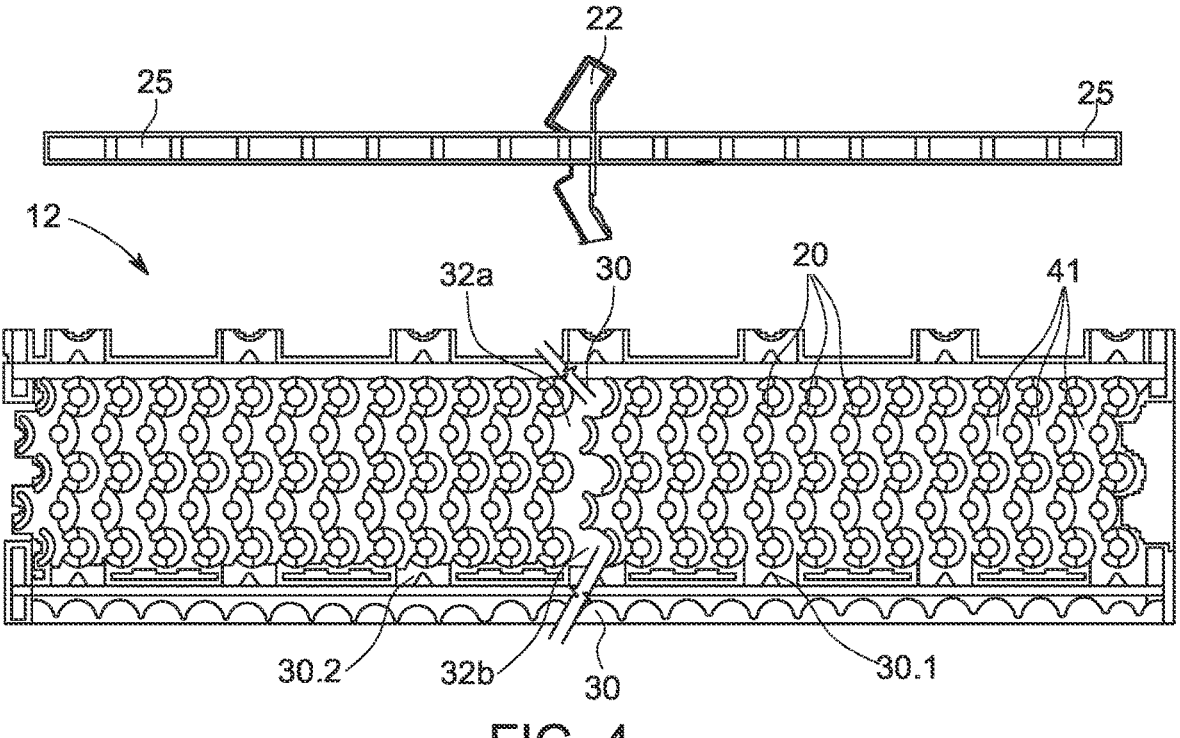
FIG. 4 is a top view of a battery module and a collector circuit board according to an embodiment of the present disclosure.

FIG. 4 illustrates a top view of the battery module 12 and the collector circuit board 22 according to an embodiment of the present disclosure.

The representation of the battery module 12 and the collector circuit board 22 with the interconnection arrangement 25 is provided to show the arrangement of the pairs 32a, 32b of adjacent cell retainers 31 in which the BMMs 21 are arranged. Between the two pairs 32a, 32b of adjacent cell retainers 31, another cell retainer 31 is arranged. In this cell retainer 31, that is, the cell retainer 31 which is arranged between the two pairs 32a, 32b of adjacent cell retainers 31, an adapter 23, which is shown in FIG. 6 and described in more detail with reference thereto, is to be retained for mounting the collector circuit board 22 to the battery module 12.

In the illustrated embodiment, the battery module 12 includes two adjacently arranged cell carriers 30.1, 30.2. The cell carriers 30.1, 30.2 are stackable to be stacked to form a modular battery module 12, as described with reference to FIGS. 8 and 9. The pairs 32a, 32b of adjacent cell retainers 31 in which the BMMs 21 are to be arranged are in the cell carrier 30.1 as indicated schematically. The cell carrier 30.2 adjacently arranged to the cell carrier 30.1 includes only the battery cells 20.

Figures 5, 6, 7:
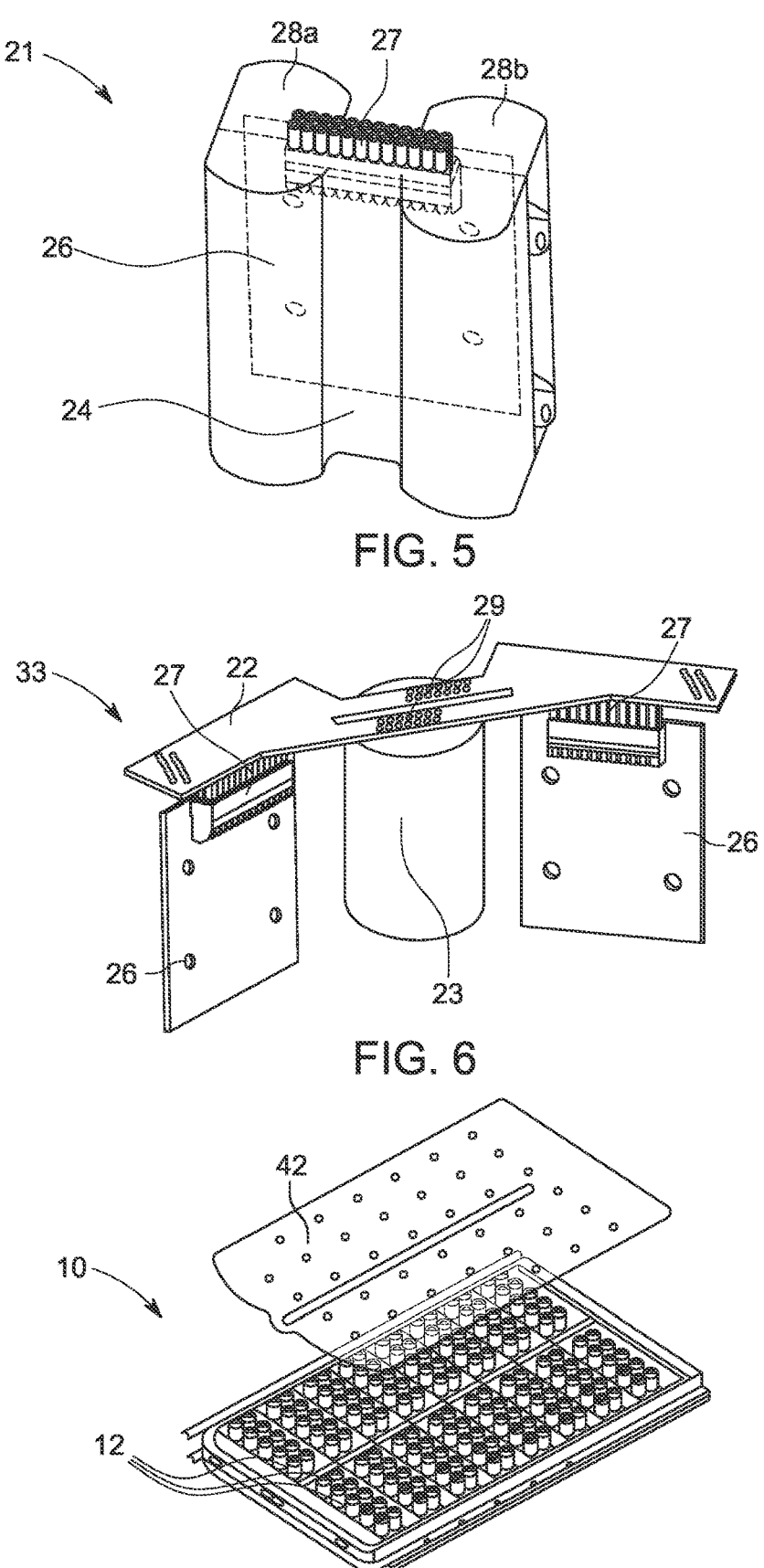
FIG. 5 is a perspective and semi-transparent view of a BMM carrier carrying a battery management module according to an embodiment of the present disclosure.
FIG. 6 is a perspective view of a BMM arrangement according to an embodiment of the present disclosure.
FIG. 7 is a perspective view of a battery pack according to an embodiment of the present disclosure.

FIG. 5 is a perspective and semi-transparent view of a BMM carrier 24 for carrying a battery management module (BMM) 21 according to an embodiment of the present disclosure.

The BMM carrier 24 is configured to retain the BMM 21 within two adjacent cell retainers 31 of a cell carrier 30 for a battery module 12. In some embodiments, the BMM carrier 24 includes a housing made of plastic. The housing has two cylindrical carrier sections 28a, 28b that are configured to be retained in one of the cell retainers 31, respectively. The carrier sections 28a, 28b have a diameter that matches the diameter of the cell retainers 31 such that carrier sections 28a, 28b can be held in a form locking manner within the cell retainers 31.

The BMM 21 includes a printed circuit board 26 (indicated with a dotted line) with an electrical connector 27. The printed circuit board 26 is retained within the BMM carrier 24 so that the electrical connector 27 remains accessible. The printed circuit board 26 extends through the BMM carrier 24 from one of the carrier sections 28a to the other carrier section 28b.

FIG. 6 is a perspective view of a BMM arrangement 33 according to an embodiment of the present disclosure. The BMMs arrangement 33 includes two BMMs 21, a collector circuit board 22 configured to electrically connect the two BMMs 21 to a plurality of battery cells 20, and an adapter 23 mounted to the collector circuit board 22. The BMM arrangement 33 as shown in FIG. 6 is at least partly shown in and/or explained with reference to FIGS. 1 to 5.

The adapter 23 is configured to be arranged within a cell retainer 31 of a cell carrier 30 in a form locking manner. In the illustrated embodiment, the adapter 23 is schematically illustrated as a cylinder. The adapter 23 has a diameter that matches the diameter of the cell retainers 31 such that the adapter 23 can be held in a form locking manner within the cell retainer 31. The adapter 23 is mounted to the collector circuit board 22 to ensure that the collector circuit board 22 is held fixed in the battery module 12 when the adapter 23 is mounted to the cell retainer 31. The adapter 23 may be hollow to retain electrical components.

The collector circuit board 22 has a symmetric shape, and the adapter 23 is mounted centrally with respect to the collector circuit board 22. The collector circuit board 22 has two outwardly extending sections at which the electrical connectors 27 of the BMMs 21 are connectable to the collector circuit board 22. The outwardly extending sections of the collector circuit board 22 are arranged so that the printed circuit boards 26 and, therefore, the BMMs 21, are arrangeable in two pairs 32a, 32b of adjacent cell retainers 31.

The collector circuit board 22 includes an interconnection connector 29 to electrically interconnect the collector circuit board 22 and the interconnection arrangement 25 as shown in, for example, FIGS. 3 and 4 and described with reference thereto. The collector circuit board 22 is configured to be connected to the two printed circuit boards 26 via the electrical connectors 27.

In some embodiments, the BMM arrangement 33 includes two BMM carriers 24 to retain each of the printed circuit boards 26, as explained with reference to FIG. 5.

FIG. 7 is a perspective view of a battery pack 10 according to an embodiment of the present disclosure.

The battery pack 10 includes a plurality of battery modules 12, as described with reference to FIGS. 1 to 6. The battery pack 10 further includes a removable cover, which provides a removable bottom cover 42 for the battery modules 12. Each of the BMMs 21 is removably arranged within two of the cell retainers 31 of the cell carriers 30 of the battery modules 12.

A method for assembly of a battery module 12 including the battery pack 10 includes: providing a plurality of battery cells 20, the cell carrier 30, and two BMMs 21; and arranging the two BMMs 21 within the cell retainers 31 of the cell carrier 30. The electrical interconnection of the components is achieved by attaching (e.g., welding) the interconnection arrangement 25 to the busbars 41 of the cell stack, and connecting the interconnection arrangement 25 with the collector circuit board 22. Subsequently, the BMMs 21 within the BMM carriers 24 are inserted from the bottom into empty battery slots, that is, empty or unoccupied cell retainers 31. The electrical connectors 27 of the BMMs 21 are thereby attached to corresponding connector of collector circuit board 22.

FIG. 8 is a perspective view of a cell carrier 30 and a plurality of battery cells 20. The cell carrier 30 as shown in FIG. 8 can be used to assemble a battery module 12 according to embodiments of the present disclosure.

The cell carrier 30 includes two meandering ribs 133a, 133b that are spaced apart from each other. In some embodiments, the cell carriers 30 and, thus, the meandering ribs 133a, 133b, are made of a polymer.

The cell carrier 30 includes a first plurality of cell retainers 31a and a second plurality of cell retainers 31b. Each of the cell retainers 31a, 31b is configured to hold a battery cell 20 in a form locking manner. In one embodiment, each of the plurality of cell retainers 31a, 31b includes five cell retainers 31a, 31b.

The meandering ribs 133a, 133b delimit (e.g., form) the cell retainers 31a, 31b. For example, the surface (e.g., the inner surface) of the cell retainers 31a, 31b is formed by the meandering ribs 133a, 133b. The meandering ribs 133a, 133b provide (or form) the retainers 31a, 31b in the form cavities for accommodating battery cells 20.

The first plurality of cell retainers 31a of the cell carrier 30 is arranged between the two meandering ribs 133a, 133b. The two meandering ribs 133a, 133b are arranged and shaped so that the first plurality of cell retainers 31a is meanderingly arranged between the two ribs 133a, 133b. The first plurality of cell retainers 31a is arranged in a first meandering row.

The two meandering ribs 133a, 133b basically extend (e.g., generally or primarily extend) in a principal extension plane of the respective rib 133a, 133b. The meandering (e.g., undulating) ribs 133a, 133b alternatingly extend to either of the two opposite sides with respect the principal extension plane. Therein, each of the two meandering ribs 133a, 133b has a width that periodically changes along the respective length of the meandering rib 133a, 133b to form the cell retainers 31a, 31b in a meandering, undulating manner.

The second plurality of cell retainers 31b is arranged opposite to the first plurality of cell retainers 31a and is separated therefrom by one of the at least two meandering ribs 133a. For example, the second plurality of cell retainers 31b is separated from the first plurality of cell retainers 31a by the first meandering rib 133a. Thus, the second plurality of cell retainers 31b is arranged in a second meandering row that is separated from the first meandering row by the first meandering rib 133a.

Each of the first and second plurality of cell retainers 31a, 31b is arranged in a meandering row so that a plurality of adjacently arranged rows form a hexagonal arrangement of cell retainers 31a, 31b, which is described in more detail with reference to FIG. 10. Thus, the cell retainers 31a, 31b are arranged in a hexagonal pattern.

In some embodiments, each of the cell retainers 31a, 31b is cylindrically shaped and includes a cylindrical through-hole or a section thereof. For example, each of the first plurality of cell retainers 31a has a through-hole, and each of the second plurality of cell retainers 31b is formed by a cylinder segment and has a corresponding opening in form of a section of a through-hole. Each of the cell retainers 31a, 31b includes a projection 34 to prevent the battery cells 20 and/or the BMM 21 held therein from moving, for example, from moving along their cylindrical axes. Each of the projections 34 is ring-shaped to effectively reduce the diameter of the respective through-hole and/or of the cell retainers 31a, 31b. For example, each of the projections 34 of the first plurality of cell retainers 31a is O-ring-shaped, and each of the projections 34 of the second plurality of cell retainers 31b is shaped as a segment of an O-ring.

The first plurality of cell retainers 31a includes a plurality of connected cell retainers 31a. For example, the cell carrier 30 is shaped so that each of the first plurality of cell retainers 31a is shaped as a cylinder segment, and a circumferential section of each of the cell retainer 31a is open connect adjacent cell retainers 31a of the first plurality of cell retainers 31a to each other. Thus, the first plurality of cell retainers 31a forms a meandering row of interconnected cell retainers 31a.

Similarly, the second plurality of cell retainers 31b includes a plurality of connected cell retainers 31b. For example, the cell carrier 30 is shaped so that each of the second plurality of cell retainers 31b is shaped as a cylinder segment, and a circumferential section of each of the cell retainers 31b is open connect to adjacent cell retainers 31b of the second plurality of cell retainers 31b to each other. Thus, the second plurality of cell retainers 31b forms a meandering row of interconnected cell retainers 31b.

The cell carrier 30 is stackable so that a battery module 12 can be built from stacked cell carriers 30.

In some embodiments, the cell carrier 30 includes an even number of cell retainers 31a, 31b while including an odd number of first cell retainers 31a and an odd number of second cell retainers 31b. In total, the cell carrier 30 in FIG. 8 includes ten cell retainers 31a, 31b (e.g., five first cell retainers 31a and five second cell retainers 31b).

Each of the battery cells 20 has a cylindrical shape. The shape of the battery cells 20 match the shape of the cell retainers 31a, 31b such that the battery cells 20 can be held (or fixed) by and within the cell retainers 31a, 31b. The battery cells 20 may be mounted to the cell carrier 30 by inserting them along their respective cylinder axis into the cell retainers 31a, 31b. Each of the cell retainers 31a, 31b includes a projection 34 that is dimensioned so that the battery cells 20 are prevented from moving through the cell retainers 31a, 31b. To improve fastening of the battery cells 20 within the cell retainers 31a, 31b, the battery module 12 may include an adhesive. The adhesive can be applied to the surfaces that delimit the cell retainers 31a, 31b and/or to the projections 34.

FIG. 9 is a perspective view of a cell assembly 36. The cell assembly 36 as shown in FIG. 9 can be used to assemble a battery module 12.

The cell assembly 36 includes the cell carrier 30, as shown in FIG. 8 and described with reference thereto, the plurality of battery cells 20, and a busbar 41.

The plurality of battery cells 20 is arranged in the cell retainers 31a, 31b of the cell carrier 30 as described with reference to FIG. 8.

The plurality of battery cells 20 is electrically interconnected by the busbar 41, which is welded to the battery cells 20 to electrically interconnect the battery cells 20 with each other.

The busbar 41 includes a plurality of connection members 43, each of which is configured and arranged to electrically connect to a terminal of one of the battery cells 20 retained by the first plurality of cell retainers 31a. The connection members 43 are arranged in a meandering row corresponding to the meandering row in which the first plurality of cell retainers 31a is arranged.

The busbar 41 also includes a covering section 44 configured and arranged to connect to a plurality of battery cell casings, also called housings, of the battery cells 20. The covering section 44 is arranged in a meandering manner to correspond to the meandering row in which the second plurality of cell retainers 31b is arranged.

In the illustrated embodiment, a 5p connection is formed in which ten battery cells 20 are placed into the plastic cell carrier 30 and the busbar 41 is welded with its covering section 44 on a negative potential on the shoulder of one row (e.g., on the battery cells 20 retained by the second plurality of cell retainers 31b) and the connection members 43 on the positive terminal on another row (e.g., on the battery cells 20 retained by the first plurality of cell retainers 31a).

A plurality of cell assemblies as shown in FIG. 9 can be stacked together to form the battery module 12 as shown in FIG. 3 and described with reference thereto.

Figure 10A:
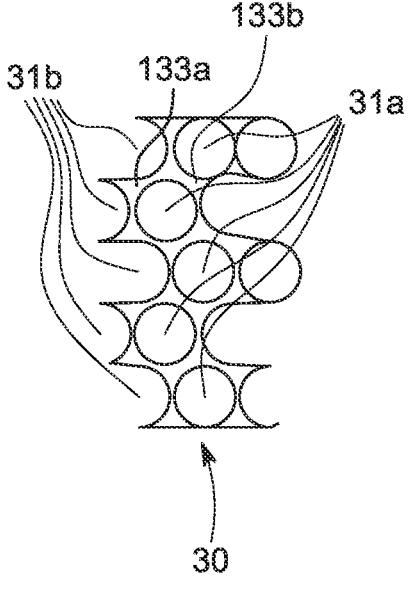
FIGS. 10A and 10B are schematic top views of a plurality of adjacently arranged cell carriers.
Figure 10B:
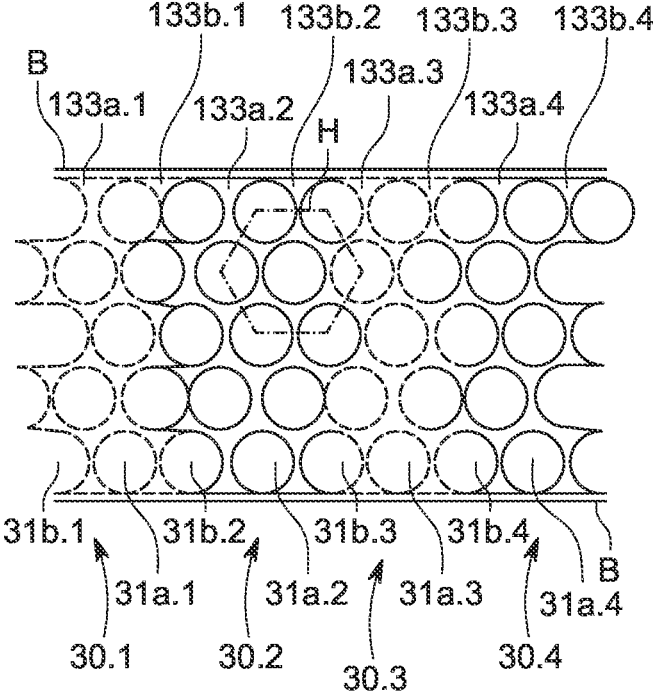

FIGS. 10A and 10B are schematic top views of a plurality of adjacently arranged cell carriers 30, 30.1, 30.2, 30.3, 30.4 according to the embodiment shown in FIG. 8. FIG. 10 illustrates the hexagonal arrangement of the first cell retainers 31a, 31a.1, 31a.2, 31a.3, 31a.4 and the second cell retainers 31b, 31b.1, 31b.2, 31b.3, 31b.4 in which battery cells 20 are to be retained.

For reference, the cell carrier 30 as illustrated in FIG. 8 is illustrated in FIG. 10A in a schematic top view. In this figure, the projections 34 of the cell carrier 30 are not shown for the sake of simplicity.

FIG. 10B illustrates four cell carriers 30.1, 30.2, 30.3, 30.4 arranged adjacent to each other. In this figure, the projections 34 of the cell carriers 30 are not shown for the sake of simplicity. For each of the cell carriers 30.1, 30.2, 30.3, 30.4, only one of the first cell retainers 31a.1, 31a.2, 31a.3, 31a.4 and one of the second cell retainers 31b.1, 31b.2, 31b.3, 31b.4 is indicated. To distinguish adjacently arranged cell carriers 30.1, 30.2, 30.3, 30.4 from each other, the cell carriers 30.1, 30.2, 30.3, 30.4 are alternatingly indicated with a solid line or with a dashed line.

For example, regarding cell carrier 30.2, each of the first cell retainers 31a.2 is arranged in a meandering row and is indicated by a circle with a solid line and each of the second cell retainers 31b.2 is arranged in a meandering row and is indicated by a circle with a line which is half solid. The first cell retainers 31a.2 and the second cell retainers 31b.2 are separated from each other by a meandering rib 133a.2. The first cell retainers 31a.3 and the second cell retainers 31b.3 of the adjacent cell carrier 30.3, indicated by dashed lines, are separated from each other by a meandering rib 133a.3. The second cell retainers 31b. 1 and the first cell retainers 31a.1 of the adjacent cell carrier 30.1, indicated by dashed lines, are separated from each other by a meandering rib 133a.1. The above configuration can be repeated analogously for any of the cell carriers 30.1, 30.2, 30.3, 30.4.

For an illustrative purpose, a boundary B is indicated that represents a section of the exterior contour of the four cell carriers 30.1, 30.2, 30.3, 30.4. The cell retainers 31a.1, 31a.2, 31a.3, 31a.4, 31b.1, 31b.2, 31b.3, 31b.4, which are not adjacent to the boundary B of the adjacently arranged cell carriers 30.1, 30.2, 30.3, 30.4, are arranged in a hexagonal pattern. In other words, each of the cell retainers 31a.1, 31a.2, 31a.3, 31a.4, 31b.1, 31b.2, 31b.3, 31b.4 that are not adjacent to the boundary B of the adjacently arranged cell carriers 30.1, 30.2, 30.3, 30.4 has six adjacently arranged cell retainers 31a.1, 31a.2, 31a.3, 31a.4, 31b.1, 31b.2, 31b.3, 31b.4

A hexagon H is indicated with a dash-dotted line to illustrate the hexagonal pattern in which the cell retainers 31a.1, 31a.2, 31a.3, 31a.4, 31b.1, 31b.2, 31b.3, 31b.4 are arranged. The hexagon H is not physically present but is indicated to illustrate the arrangement of the cell retainers 31a.1, 31a.2, 31a.3, 31a.4, 31b.1, 31b.2, 31b.3, 31b.4. The hexagon H at the particularly illustrated position illustrates that the second cell retainer 31b.3 of the cell carrier 30.3 arranged in the center of the hexagon H has six neighboring cell retainers 31a.2, 31a.3, 31b.3, including three first cell retainers 31a.2 of the adjacently arranged cell carrier 30.2, one first cell retainer 31a.3 of the cell retainer 30.3, and two second cell retainers 31b.3 of the cell retainer 30.3. The above configuration and explanation can be repeated analogously for any of the cell retainers 31a.1, 31a.2, 31a.3, 31a.4, 31b.1, 31b.2, 31b.3, 31b.4 that are not adjacent to the boundary B of the adjacently arranged cell carriers 30.1, 30.2, 30.3, 30.4.

Thus, each of the first and second plurality of cell retainers 31a.1, 31a.2, 31a.3, 31a.4, 31b.1, 31b.2, 31b.3, 31b.4, except for the cell retainers 31a.1, 31a.2, 31a.3, 31a.4, 31b.1, 31b.2, 31b.3, 31b.4 at the boundary B of the cell carriers 30.1, 30.2, 30.3, 30.4, is arranged in a meandering row so that a plurality of adjacently arranged rows form a hexagonal arrangement of cell retainers 31a.1, 31a.2, 31a.3, 31a.4, 31b.1, 31b.2, 31b.3, 31b.4.

SOME REFERENCE SIGNS

10 battery pack
12 battery module
20 battery cell
21 battery management module (BMM)
22 collector circuit board
23 adapter
24 BMM carrier
25 interconnection arrangement
26 printed circuit board
27 electrical connector
28a, 28b carrier section
29 interconnection connector
30, 30.1, 30.2, 30.3, 30.4 cell carrier
31, 31a, 31b cell retainer
32a, 32b pair of adjacent cell retainers
33 BMM arrangement
34 projection
36 cell assembly
41 busbar
42 bottom cover
43 connection member
44 covering section
31a, 31a.1, 31a.2, 31a.3, 31a.4 first cell retainer
31b, 31b.1, 31b.2, 31b.3, 31b.4 second cell retainer
133a, 133a.1, 133a.2, 133a.3, 133a.4 meandering rib
133b, 133b.1, 133b.2, 133b.3, 133b.4 meandering rib
300 vehicle
301 interconnects
310 motor
B boundary
H hexagon

What is claimed is:

1. A battery module comprising:
a plurality of battery cells;
a cell carrier comprising a plurality of cell retainers, each of the cell retainers being configured to hold one of the battery cells in a form locking manner; and
a battery management module (BMM) arranged within a group of the cell retainers.

2. The battery module according to claim 1, wherein the BMM is arranged within the group of the cell retainers in a form locking manner.

3. The battery module according to claim 1, further comprising a BMM carrier configured to retain the BMM within the group of the cell retainers.

4. The battery module according to claim 3, wherein the cell retainers in the group of the cell retainers are adjacent to each other, and
wherein the BMM carrier is arranged in the group of the cell retainers.

5. The battery module according to claim 1,
wherein each of the battery cells is cylindrically shaped, and
wherein each of the cell retainers is at least partly cylindrically shaped.

6. The battery module according to claim 1,
wherein each of the battery cells is cylindrically shaped, and
wherein each of the cell retainers has a cylindrical through-hole.

7. The battery module according to claim 1, further comprising a removable bottom cover,
wherein the BMM is removably arranged within the group of the cell retainers.

8. The battery module according to claim 1, further comprising an adapter and a collector circuit board configured to electrically connect the BMM with one or more of the battery cells, wherein the adapter is mounted to the collector circuit board and is arranged within one cell retainer of the group of the cell retainers in a form locking manner.

9. The battery module according to claim 8, further comprising a plurality of the BMMs, wherein the collector circuit board is adapted to electrically connect each of the battery cells with one of the BMMs.

10. The battery module according to claim 1, wherein the cell retainers are arranged in a hexagonal pattern.

11. The battery module according to claim 1, wherein the cell retainers are arranged in a meandering row such that a plurality of adjacently arranged rows form a hexagonal arrangement of cell retainers.

12. The battery module according to claim 1, further comprising a plurality of the cell carriers, the cell carriers being stacked on each other to form the battery module, wherein the group of the cell retainers in which the BMM is arranged is within one of the cell carriers.

13. The battery module according to claim 1, further comprising a plurality of the cell carriers, the cell carriers being stacked on each other to form the battery module, wherein the group of the cell retainers in which the BMM is arranged comprises cell retainers of two adjacently arranged ones of the cell carriers.

14. A battery pack comprising a plurality of the battery module according to claim 1.

15. An electric vehicle comprising the battery pack according to claim 14.

16. An electric vehicle comprising the battery module according to claim 1.

17. A BMM carrier configured to retain a BMM within a plurality of adjacent ones of the cell retainers of the cell carrier for the battery module according to claim 1.

18. A BMM arrangement comprising:

a plurality of BMMs;

a collector circuit board configured to electrically connect the BMMs with one or more battery cells; and an adapter mounted to the collector circuit board, the adapter being configured to be arranged within at least one cell retainers of a cell carrier in a form locking manner.

19. A method for assembly of the battery module according to claim 1, the method comprising:

providing the plurality of battery cells, the cell carrier, and the BMM; and arranging the BMM within a plurality of the cell retainers.

\* \* \* \* \*